(12) United States Patent
Miyazaki

(10) Patent No.: US 11,907,594 B2
(45) Date of Patent: Feb. 20, 2024

(54) IMAGE FORMING APPARATUS, CONTROL METHOD AND COMPUTER-READABLE RECORDING MEDIUM DIVIDING A PRINT JOB INTO A PLURALITY OF SHORT JOBS

(71) Applicant: Konica Minolta, Inc., Tokyo (JP)

(72) Inventor: Ken Miyazaki, Kanagawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/814,864

(22) Filed: Jul. 26, 2022

(65) Prior Publication Data

US 2023/0036626 A1 Feb. 2, 2023

(30) Foreign Application Priority Data

Aug. 2, 2021 (JP) .................................. 2021-126818

(51) Int. Cl.
*G06F 3/12* (2006.01)
*G03G 15/00* (2006.01)

(52) U.S. Cl.
CPC .......... *G06F 3/1241* (2013.01); *G03G 15/50* (2013.01); *G06F 3/1217* (2013.01); *G06F 3/1251* (2013.01); *G03G 2215/00126* (2013.01)

(58) Field of Classification Search
None
See application file for complete search history.

(56) References Cited

U.S. PATENT DOCUMENTS

2019/0286037 A1* 9/2019 Kimura ................ G03G 15/556
2020/0073607 A1* 3/2020 Uchida ................ G06F 3/1208

FOREIGN PATENT DOCUMENTS

JP 2019159255 9/2019
JP 2020038276 3/2020

* cited by examiner

*Primary Examiner* — Andrew H Lam
(74) *Attorney, Agent, or Firm* — BakerHostetler

(57) ABSTRACT

An image forming apparatus according to the present disclosure includes: a hardware processor configured to control an image former on a basis of a job pertaining to a printing execution command. The hardware processor is configured to divide the job pertaining to the printing execution command into a plurality of short jobs, and configured to stop conveyance of the roll sheet and forcibly eject degraded toner from a developing device of the image former at a pause timing between short jobs temporally adjacent to each other among the plurality of short jobs; and the hardware processor sets a job content of each of the plurality of short jobs such that an image of a printing target is inverted upside down for each job switching of the plurality of short jobs.

11 Claims, 16 Drawing Sheets

| COVERAGE | CONTINUOUS PRINTING DISTANCE [m] |
|---|---|
| 50%~100% | 100m |
| 10%~50% | 300m |
| 2%~10% | 500m |
| 0%~2% | 3000m |

FIG. 16

IMAGE FORMING APPARATUS, CONTROL METHOD AND COMPUTER-READABLE RECORDING MEDIUM DIVIDING A PRINT JOB INTO A PLURALITY OF SHORT JOBS

CROSS REFERENCE TO RELATED APPLICATIONS

This application claims priority to Japanese Patent Application No. 2021-126818 filed on Aug. 2, 2021, the entire disclosure of which is incorporated herein by reference in its entirety.

BACKGROUND

Technological Field

The present disclosure relates to an image forming apparatus, a control method for an image forming apparatus, and a computer-readable recording medium storing a control program for an image forming apparatus.

Description of Related Art

In the related art, image forming apparatuses such as printers, copiers and the like employing electrophotographic methods have been widely used. In general, in an image forming apparatus, an image formation process is performed through a series of process in which an electrostatic latent image is written on a photoconductor drum with a uniformly charged surface by irradiating it with laser light using an optical device, the electrostatic latent image is developed using toner in the developing device, the developed toner image is transferred to a sheet through the intermediate transfer belt, and then, the transfer toner image is fixed to the sheet.

It is known that in the above-described electrophotographic image forming apparatus, the electric charge characteristics of the toner are degraded with time when the toner is agitated together with the developer in the developing device. This phenomenon is considered to occur in such a manner that as the toner and the carrier in the developer are agitated in the developing device, the external additive in the developer is buried in the toner surface, or separated from the toner. In particular, in the case where image formation is performed with a low coverage, the toner is continuously agitated in the developing device without being replaced, and consequently the degradation of the toner becomes significant. When the toner is degraded, the charging characteristic may be reduced and consequently disruption of images on the photoconductor drum and the toner scattering from developing device and the like may occur, degrading the image quality of images formed on sheets.

In view of this, a known image forming apparatus has a function (hereinafter referred to as "the RFP control") of forcibly ejecting, to the outside, the degraded toner retained in the developing device (hereinafter referred to as "degraded toner") between sheets and the like (see, for example, PTL 1 (Japanese Patent Application Laid-Open No. 2019-159255)). In the RFP control, for example, a toner band called refresh toner patch is ejected from the developing device onto the intermediate transfer belt. Note that at this time, the degraded toner image ejected onto the intermediate transfer belt is removed by a cleaning part for the bearing member (e.g., a belt cleaning device described later). Then, in the developing device, new toner is appropriately supplied in accordance with the amount of the toner in the developing device.

In the image forming apparatus of this type, normally, when forming an image on each single sheet (flat sheet), the RFP control is implemented at timing when the image formation is not performed, such as between sheets, for example.

However, in the case where image formation is performed on a long sheet such as a roll sheet, there is no region for forming a refresh toner patch between images, for example. Therefore, the image forming apparatus of known technology is set such that in the case of printing on a roll sheet, the RFP control is automatically executed at the estimated timing when the amount of the degraded toner retained in the developing device has reached a threshold value during the printing on the roll sheet.

However, with such a method, blank regions where no image is formed are generated in the conveyance direction in the roll sheet after printing. The reason for this is that, for example, in the image forming apparatus of the known technology, the intermediate transfer unit is operated such that the degraded toner ejected onto the intermediate transfer belt along with the execution of the RFP control is not transferred to the roll sheet but is collected by the belt cleaning device disposed at a succeeding stage of the intermediate transfer belt (e.g., the control of releasing the pressure of the secondary transfer nip described later is performed).

FIG. 1 is a diagram illustrating an example of a blank region formed in roll sheet P after printing.

In general, a roll sheet in which a blank region is formed is treated as a defective sheet (e.g., in the case where a label is the printing target as in FIG. 1, the label formation position is shifted in the course of it, and consequently the position of the label is shifted when bonding the label to a pet bottle or the like with a labeler machine). As such, in the case where a blank region is formed in a roll sheet, the worker performs an operation of manually cutting out the blank region in the roll sheet to remove the blank region from the roll sheet on the job site, and joining both ends of the blank region to obtain a printed roll sheet of the end product (hereinafter referred to also as "product roll sheet").

With such a method, however, it is necessary to find out the blank region from the roll sheet after printing, which leads to the reduction of the production efficiency and the increase of the burden of the operation of the worker, and further, the blank region may remain in the roll sheet due to operation errors. Moreover, such a method requires a high degree of skill of the operator. In addition, with such a method, the paper portion of the blank region cut out from the roll sheet is discarded, which is a problem in terms of effective utilization of resources.

SUMMARY

In view of the above-mentioned problems, an object of the present disclosure is to provide an image forming apparatus, a control method for the image forming apparatus, and a computer-readable recording medium storing a control program of the image forming apparatus that enables a manufacturing process for product roll sheets that is more suitable in terms of product quality, production efficiency, and operator workload.

To solve the above-described problems, an image forming apparatus of a roll-to-roll type the present disclosure mainly includes: an image former including an image bearing member configured to bear toner, the image former being configured to perform printing, on a roll sheet, an image formed by performing light exposure and a development process on the image bearing member; and a hardware processor configured to control the image former on a basis of a job pertaining to a printing execution command. The hardware processor is configured to divide the job pertaining to the printing execution command into a plurality of short jobs, and configured to stop conveyance of the roll sheet and forcibly eject degraded toner from a developing device of the image former at a pause timing between short jobs temporally adjacent to each other among the plurality of short jobs; and the hardware processor sets a job content of each of the plurality of short jobs such that an image of a printing target is inverted upside down for each job switching of the plurality of short jobs.

In addition, another aspect is a control method for an image forming apparatus of a roll-to-roll type, the image forming apparatus including an image bearing member configured to bear toner, and an image former configured to perform printing, on a roll sheet, an image formed by performing light exposure and a development process on the image bearing member, the control method including: a first process of dividing a job pertaining to a printing execution command into a plurality of short jobs; and a second process of stopping conveyance of the roll sheet and forcibly ejecting degraded toner from a developing device of the image former at a pause timing between short jobs temporally adjacent to each other among the plurality of short jobs at execution of printing. In the first process, a job content of each of the plurality of short jobs is set such that an image of a printing target is inverted upside down for each job switching of the plurality of short jobs.

In addition, another aspect is a computer-readable recording medium storing a control program of an image forming apparatus of a roll-to-roll type, the image forming apparatus including an image bearing member configured to bear toner, and an image former configured to perform printing, on a roll sheet, an image formed by performing light exposure and a development process on the image bearing member, the program including: a first process of dividing a job pertaining to a printing execution command into a plurality of short jobs; and a second process of stopping conveyance of the roll sheet and forcibly ejecting degraded toner from a developing device of the image former at a pause timing between short jobs temporally adjacent to each other among the plurality of short jobs at execution of printing. In the first process, a job content of each of the plurality of short jobs is set such that an image of a printing target is inverted upside down for each job switching of the plurality of short jobs.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 16 is a diagram illustrating an example of data table that defines a correspondence relationship between a continuous printing distance of a short job and a coverage of an image of a printing target referred to by a control part in Modification 2.

DETAILED DESCRIPTION OF EMBODIMENTS

Figure 1:
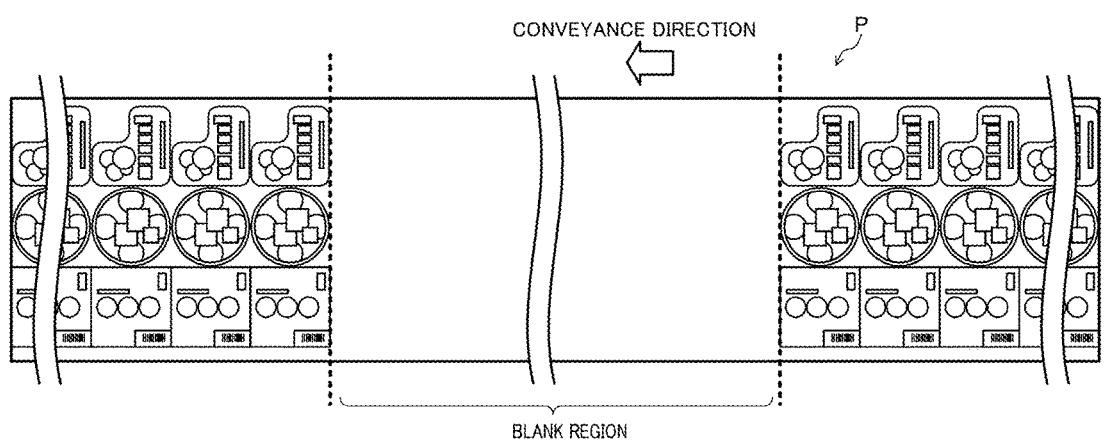
FIG. 1 is a diagram illustrating an example of a blank region formed in a roll sheet after printing.

Hereinafter, one or more embodiments of the present invention will be described with reference to the drawings. However, the scope of the invention is not limited to the disclosed embodiments.

A preferred embodiment of the present disclosure is elaborated below with reference to the drawings. Note that in the specification and drawings, components with virtually identical functions are denoted with the same reference numerals and overlapping description thereof is omitted.

Configuration of Image Forming Apparatus

A configuration of an image forming apparatus according to an embodiment of the present invention (hereinafter referred to as "image forming apparatus U") is described below with reference to FIGS. 2 and 3.

Figure 2:
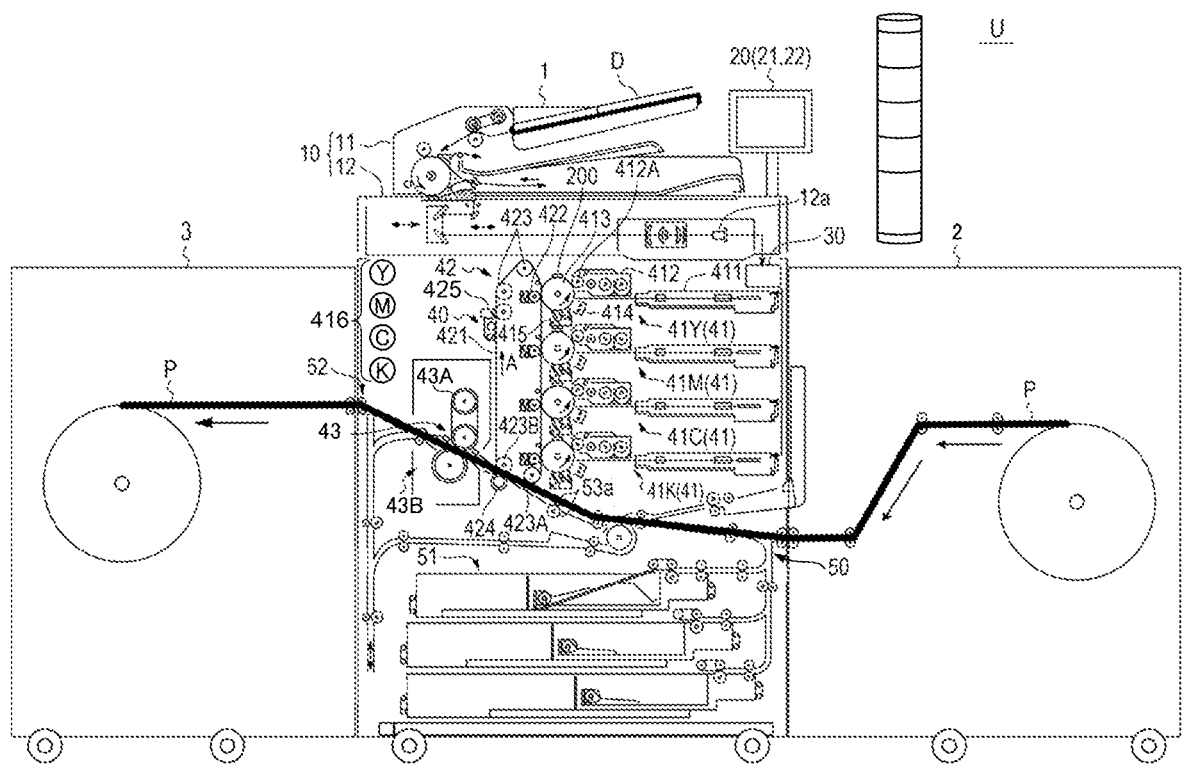
FIG. 2 is a diagram illustrating a general configuration of an image forming apparatus according to an embodiment.
Figure 3:
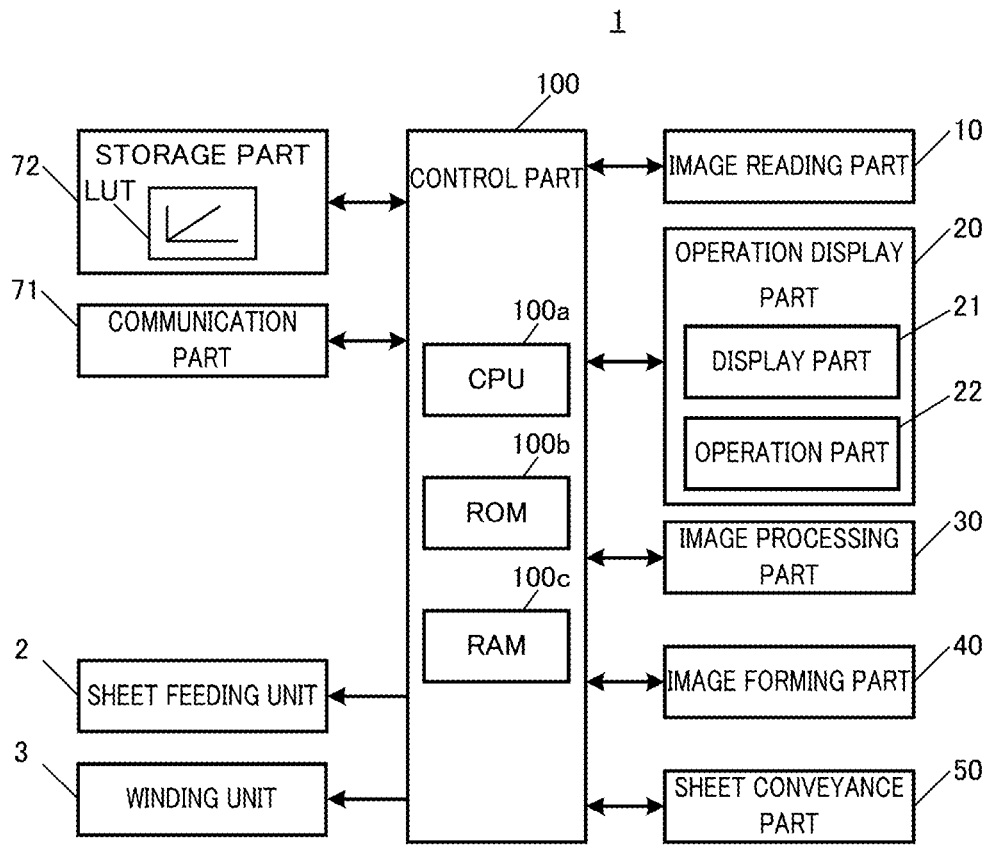
FIG. 3 is a diagram illustrating a configuration of a principal part of a control system of the image forming apparatus according to the embodiment.

FIG. 2 is a diagram illustrating a general configuration of image forming apparatus U according to the present embodiment. FIG. 3 is a diagram illustrating a configuration of a principal part of a control system of image forming apparatus U according to the present embodiment.

Image forming apparatus U is a roll-to-roll image forming apparatus in which sheet feeding unit 2, image forming apparatus main body 1 and winding unit 3 are connected from the upstream side toward the downstream side along the conveyance direction of sheet P. Specifically, in the present embodiment, a roll sheet (hereinafter referred to as "roll sheet P" or "sheet P") supplied from sheet feeding unit 2 is used as a printing target sheet.

Sheet feeding unit 2 feeds sheet P to image forming apparatus main body 1. In the housing of sheet feeding unit 2, sheet P is wound around the support shaft and rotatably held. Sheet feeding unit 2 conveys sheet P wound around the support shaft at a constant speed to image forming apparatus main body 1 via the plurality of conveyance roller pairs such as delivery rollers and feeding rollers, for example. The sheet feeding operation of sheet feeding unit 2 is controlled by control part 100 provided in image forming apparatus main body 1.

Image forming apparatus main body 1 is an intermediate transfer type printer utilizing an electrophotographic process technique. Specifically, image forming apparatus main body 1 performs primary transfer, onto intermediate transfer belt 421, of toner images with toner colors of Y (yellow), M (magenta), C (cyan), K (black) formed on photoconductor drum 413, and superimposes the toner images of the four colors on intermediate transfer belt 421, and then, performs secondary transfer to sheet P fed from sheet feeding unit 2, thus forming images on sheet P.

In addition, image forming apparatus main body 1 is of a tandem type in which photoconductor drums 413 corresponding to four colors Y, M, C and K are disposed in series in the travelling direction of intermediate transfer belt 421, and the toner images of respective toner colors are sequentially transferred to intermediate transfer belt 421 through one procedure.

Image forming apparatus main body 1 includes image reading part 10, operation display part 20, image processing part 30, image forming part 40, sheet conveyance part 50, communication part 71, storage part 72, and control part 100.

Image reading part 10 includes auto document feeder 11 called auto document feeder (ADF), document image scanning device 12 (scanner) and the like.

Auto document feeder 11 conveys document D placed on the document tray by using a conveyance mechanism and feeds it to document image scanning device 12. With auto document feeder 11, the images of a plurality of documents D (including both sides) placed on the document tray can be continuously read at once.

Document image scanning device 12 optically scans documents conveyed from auto document feeder 11 onto the contact glass or documents placed on the contact glass, forms images of the reflection light from documents on the light-receiving surface of charge coupled device (CCD) sensor 12a, and thus reads document images. Image reading part 10 generates the input image data on the basis of the scanning result of document image scanning device 12. This input image data is subjected to a predetermined image processing at image processing part 30.

Operation display part 20 is composed of a liquid crystal display (LCD) provided with a touch panel, and functions as display part 21 and operation part 22, for example. Display part 21 displays various operation screens, the state of the image, the operation status of each function, information relating to the printing and the like in accordance with the display control signal input from control part 100. Operation part 22 includes various operation keys such as numeric keys and a start key, receives various inputting operations of the user, and outputs the operations to operation signal control part 100.

Image processing part 30 includes a circuit or the like that performs digital image processing on the input image data in accordance with the initial setting or the user setting. For example, under the control of control part 100, image processing part 30 performs tone correction on the basis of tone correction data (tone correction table). In addition, image processing part 30 performs, on the input image data, various correction processes such as a color correction and a shading correction, a compression process and the like as well as the tone correction. Image forming part 40 is controlled on the basis of the image data subjected to these processes.

Note that under the control of control part 100, image processing part 30 according to the present embodiment can edit the input image data to invert the image of the printing target upside down, and can edit the input image data to invert the forward/reverse printing direction of the image of the printing target (i.e., invert the image of the printing target left to right).

Image forming part 40 includes toner image forming part 41 for forming toner images of color toners of Y-component, M-component, C-component and K-component on the basis of the input image data, intermediate transfer part 42 for transferring, to sheet P, the toner image formed by toner image forming part 41, fixing part 43 for fixing the toner image transferred to sheet P, and the like.

Toner image forming part 41 is composed of four toner image forming parts 41Y, 41M, 41C and 41K for Y-component, M-component, C-component and K-component. Toner image forming parts 41Y, 41M, 41C and 41K have the same configurations, and therefore common components are denoted with the same reference numerals for ease of illustration and description, while Y, M, C or K is attached to the reference numeral when they are discriminated. In FIG. 2, the reference numerals are indicated only for the components of toner image forming part 41Y for Y-component, and the reference numerals for the components of the other toner image forming parts 41M, 41C and 41K are omitted.

Toner image forming part 41 includes exposing device 411, developing device 412, photoconductor drum 413, charging device 414, drum cleaning device 415, toner replenishment part 416 and the like.

Photoconductor drum 413 is a negative charge type organic photo-conductor (OPC) in which an under coat layer (UCL), a charge generation layer (CGL) and a charge transport layer (CTL) are sequentially stacked at the peripheral surface of a conductive cylindrical body (aluminum raw pipe) made of aluminum, for example. The charge generation layer is composed of an organic semiconductor in which a charge generation material (e.g., a phthalocyanine pigment) is dispersed in a resin binder (e.g., polycarbonate), and generates pairs of positive charge and negative charge through light exposure of exposing device 411, for example. The charge transport layer is composed of a hole transport material (electron-donating nitrogen compound) dispersed in a resin binder (e.g., polycarbonate resin), and the positive charge generated at the charge generation layer is transported to the surface of the charge transport layer, for example.

Charging device 414 is composed of a corona discharging generator such as a scorotron charging device and a corotron charging device, for example. Charging device 414 evenly negatively charges the surface of photoconductor drum 413 through corona discharge.

Exposing device 411 is composed of an LED print head including an LED array in which a plurality of light-emitting diodes (LEDs) is linearly arranged, an LPH driving part (driver IC) for driving each LED, a lens array for forming images of the light emitted from the LED array on photoconductor drum 413, and the like, for example. Each LED of the LED array corresponds to one dot of the image.

Exposing device 411 emits, to photoconductor drum 413, light corresponding to the image of each color component. The positive charge that is generated at the charge generation layer of photoconductor drum 413 is transported to the surface of the light emission charge transport layer, and thus the electric charge (negative charge) at the surface of photoconductor drum 413 is neutralized. In this manner, an electrostatic latent image of each color component is formed by the potential difference from its surroundings at the surface of photoconductor drum 413.

Developing device 412 stores the developer of each color component (e.g., two-component developer containing toner and magnetic carrier), attaches the toner of each color component on the surface of photoconductor drum 413, and forms toner images by visualizing electrostatic latent images. More specifically, at developing device 412, a developing bias voltage is applied to the developer bearing member (e.g., a developing roller whose reference numeral is omitted), and an electric field is formed between photoconductor drum 413 and the developer bearing member. Then, with the potential difference between photoconductor drum 413 and the developer bearing member, the charging toner on the developer bearing member moves to and adheres to the light exposure part of the surface of photoconductor drum 413.

Drum cleaning device 415 includes a drum cleaning blade (whose reference numeral is omitted) that makes sliding contact with the surface of photoconductor drum 413 and the like, and removes transfer residual toner that remains at the surface of photoconductor drum 413 after the primary transfer.

Toner replenishment part 416 includes a toner storage part (not illustrated) for loading the cartridge for each of toner colors of Y, M, C and K. Toner replenishment part 416 injects the toner in the cartridge to developing device 412 by rotating the cartridge loaded to the toner storage part at a predetermined timing in accordance with the command from control part 100, for example.

Intermediate transfer part 42 includes intermediate transfer belt 421, primary transfer roller 422, a plurality of support rollers 423, secondary transfer roller 424, belt cleaning device 425 and the like.

Intermediate transfer belt 421 is an image bearing member that bears the toner image. Intermediate transfer belt 421 is composed of an endless belt, which is stretched in a loop form around the plurality of support rollers 423. At least one of the plurality of support rollers 423 is composed of a driving roller, and the others are composed of driven rollers. When the driving roller rotates, intermediate transfer belt 421 travels at a constant speed.

Primary transfer roller 422 is disposed on the inner peripheral surface side of intermediate transfer belt 421 so as to face photoconductor drum 413 of each color component. When primary transfer roller 422 is brought into pressure contact with photoconductor drum 413 with intermediate transfer belt 421 therebetween, a primary transfer nip (hereinafter referred to as "primary transfer part") for transferring the toner image from photoconductor drum 413 to intermediate transfer belt 421 is formed.

Secondary transfer roller 424 is disposed on the outer peripheral surface side of intermediate transfer belt 421 so as to face one of the plurality of support rollers 423. Of the plurality of support rollers 423, support roller 423 that is disposed to face secondary transfer roller 424 is referred to as backup roller. When secondary transfer roller 424 is brought into pressure contact with backup roller with intermediate transfer belt 421 therebetween, a secondary transfer nip (hereinafter referred to as "secondary transfer part") for transferring the toner image from intermediate transfer belt 421 to sheet P is formed.

At the primary transfer part, the toner image on photoconductor drum 413 is sequentially primary-transferred to intermediate transfer belt 421 in an overlapping manner. More specifically, a primary transfer bias is applied to primary transfer roller 422, and an electric charge with a polarity opposite to that of the toner is given to the rear surface side (the side to be brought into contact with contact primary transfer roller 422) of intermediate transfer belt 421, and thus the toner image is electrostatically transferred to intermediate transfer belt 421.

Thereafter, when sheet P passes through the secondary transfer part, the toner image on intermediate transfer belt 421 is secondary transferred to sheet P. More specifically, a secondary transfer bias is applied to secondary transfer roller 424, and an electric charge with a polarity opposite to that of the toner is given to the rear surface side (the side to be brought into contact with secondary transfer roller 424) of sheet P, and thus, toner image is electrostatically transferred to sheet P. Sheet P on which toner image is transferred is conveyed toward fixing part 43.

Belt cleaning device 425 includes a belt cleaning blade that makes sliding contact with the surface of intermediate transfer belt 421, and the like. Belt cleaning device 425 removes the transfer residual toner that remains on the surface of intermediate transfer belt 421 after the secondary transfer.

Note that during the RFP control, a degraded toner (i.e., a refresh toner patch) that is forcibly ejected from developing device 412 onto intermediate transfer belt 421 is removed by belt cleaning device 425.

Fixing part 43 includes upper fixing part 43A including a fixing side member disposed on the side of the fixing surface sheet P, i.e., the side of the surface on which toner image is formed, lower fixing part 43B including a back side supporting member disposed on the side of the rear surface of sheet P, i.e., the side of the surface of opposite to the fixing surface, a heating source (not illustrated), and the like. When the fixing side member is brought into pressure contact with the back side supporting member, a fixing nip that conveys sheet P in a sandwiching manner is formed. By heating and pressurizing conveyed sheet P on which the toner image is secondary transferred at fixing nip, fixing part 43 fixes the toner image to sheet P.

Sheet conveyance part 50 includes sheet feeding part 51, sheet ejection part 52, conveyance path part 53 and the like. Conveyance path part 53 includes a plurality of conveyance roller pairs, and feeds, to winding unit 3, sheet P fed from sheet feeding unit 2 after conveying it to image forming part 40 and fixing part 43. Note that the plurality of conveyance roller pairs of conveyance path part 53 includes a registration roller pair that corrects skew and deviation of sheet P.

Note that sheet feeding part 51 is a feeding part of plain sheets provided separately from sheet feeding unit 2, and feeds sheets with a length smaller than the width of the main body of image forming apparatus main body 1.

Sheet P fed from sheet feeding unit 2 to image forming apparatus main body 1 is conveyed by conveyance path part 53 to image forming part 40. Then, the toner image of intermediate transfer belt 421 is collectively secondary transferred to one surface of sheet P at image forming part 40, and a fixation step is performed at fixing part 43. Sheet P on which the image is formed is conveyed by sheet ejection part 52 to winding unit 3.

Winding unit 3 winds up sheet P (i.e., roll sheet P) conveyed from image forming apparatus main body 1. In the housing of winding unit 3, sheet P is wound around the support shaft and held in a roll shape, for example. As such, winding unit 3 winds up sheet P conveyed from image forming apparatus main body 1 around the support shaft via the plurality of conveyance roller pairs (e.g., the delivery roller and the sheet ejection roller) at a constant speed. The winding operation of winding unit 3 is controlled by control part 100 provided in image forming apparatus main body 1.

Control part 100 includes central processing unit (CPU) 100a serving as a computation/control apparatus, read only memory (ROM) 100b serving as a main storage apparatus, random access memory (RAM) 100c, and the like. ROM 100b stores basic programs and basic setting data. CPU 100a performs a centralized control of operations of each block of image forming apparatus U by reading a program corresponding to the processing detail from ROM 100b or storage part 72, loading it in RAM 100b, and executing the loaded program.

Note that a part or all of the process executed by control part 100 may be executed by the electronic circuit provided for the process, such as a digital signal processor (DSP), an application specific integrated circuit (ASIC) and a programmable logic device (PLD).

Control part 100 receives printing job data sent from an external apparatus (e.g., personal computer) via communication part 71, and performs general control of each part of image forming apparatus U on the basis of the printing job data, for example. The printing job data includes the image data (input image data) of the printing target such as diagrams, photographs, letters, marks and the like, and is described in a predetermined page description language (PDL), for example.

Communication part 71 is various interfaces such as a network interface card (NIC), a MOdulator-DEModulator (MODEM), and a universal serial bus (USB). For communication part 71, short-range wireless communication interfaces such as near field communication (NFC) and Bluetooth (registered trademark) are also applicable.

Storage part 72 is an auxiliary storage apparatus such as a nonvolatile semiconductor memory (so-called flash memory) and a hard disk drive, for example.

Storage part 72 stores toner ejection control programs, look-up tables that is referred to for controlling the operation of each block of image forming apparatus U, and the like, for example. Such data may be stored in ROM 100b. The toner ejection controlling program is provided via a computer-readable transportable storage medium (which includes an optical disk, a light magnetic disc, and a memory card) in which the program is stored, for example. In addition, the data, such as the toner ejection controlling program, may be provided by downloading it from the server retaining the program through the network, for example.

In image forming apparatus U, as the toner and the carrier are agitated in developing device 412, the toner is degraded due to the external additive buried in the toner surface and/or the external additive separated from the toner. In view of this, when it is determined that degraded toner is retained in developing device 412 (i.e., in the case of continuous printing of a low coverage image for a predetermined time), image forming apparatus U according to the present embodiment under the control of control part 100 forcibly ejects the degraded toner under the stress in developing device 412, in accordance with a predetermined toner ejection condition so as to replace it with new toner (i.e., execute the RFP control).

In the RFP control, control part 100 forcibly ejects a toner band (refresh toner patch) onto intermediate transfer belt 421 from developing device 412, for example. In addition, at this time, control part 100 releases the pressure of the secondary transfer nip so that the degraded toner ejected from developing device 412 onto intermediate transfer belt 421 is collected by belt cleaning device 425 without being transferred to sheet P, for example. In addition, at this time, control part 100 supplies new toner into developing device 412 from toner replenishment part 416 in accordance with the toner amount (toner concentration) in developing device 412, for example.

Note that in image forming apparatus U according to the present embodiment, the job pertaining to the printing execution command is divided into a plurality of short jobs (hereinafter referred to as simply "short job"), and the conveyance of the roll sheet is stopped and the degraded toner is ejected from developing device 412 of image forming part 40 at the pause timing between the short jobs temporally adjacent to each other among the plurality of short jobs, except for the case where the image of the printing target is a high coverage image. That is, in image forming apparatus U according to the present embodiment, when it is determined that that the RFP control should be executed during the printing on roll sheet (sheet), the conveyance of the roll sheet is stopped at the execution timing of the RFP control, and the replacement operation of the roll sheet of the printing target is implemented. This means that a plurality of roll sheets is used until the printing of all of the image according to the printing command is completed (details are described later with reference to FIG. 5).

In the manufacturing process of the product roll sheet according to the present embodiment, one product roll sheet is manufactured by joining a plurality of roll sheets printed by image forming apparatus U into a single roll by using the sheet joining auxiliary apparatus.

Configuration of Sheet Joining Auxiliary Apparatus

Next, with reference to FIG. 4, a configuration of a sheet joining auxiliary apparatus (hereinafter referred to as "sheet joining auxiliary apparatus T") according to the embodiment of the present invention is described.

Figure 4:
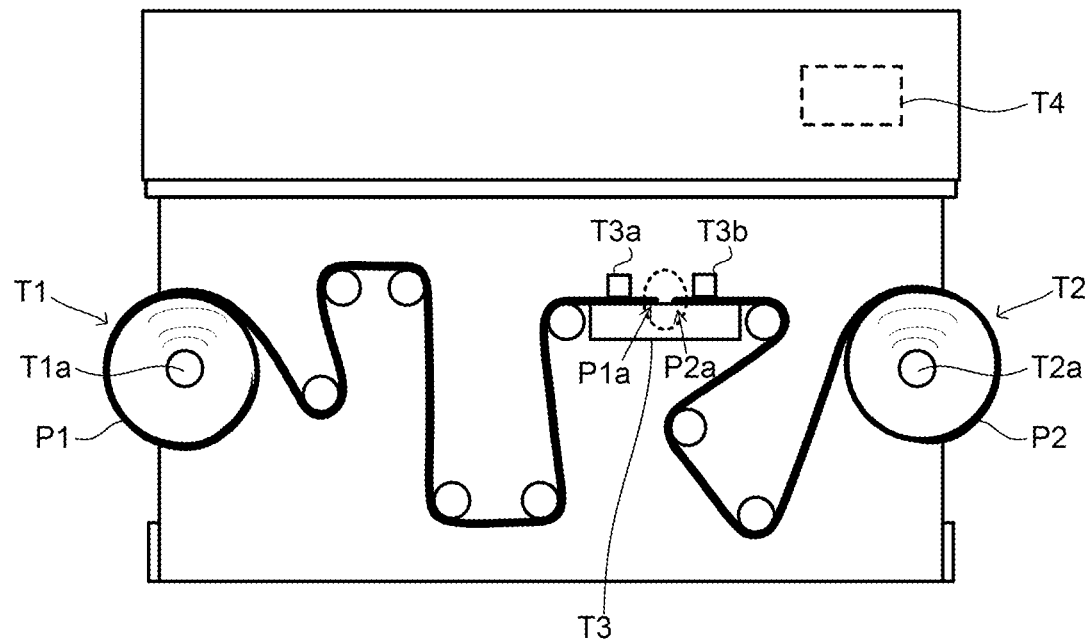
FIG. 4 is a diagram illustrating a configuration of a sheet joining auxiliary apparatus according to the embodiment.

FIG. 4 is a diagram illustrating a configuration of sheet joining auxiliary apparatus T according to the present embodiment.

Figure 5:
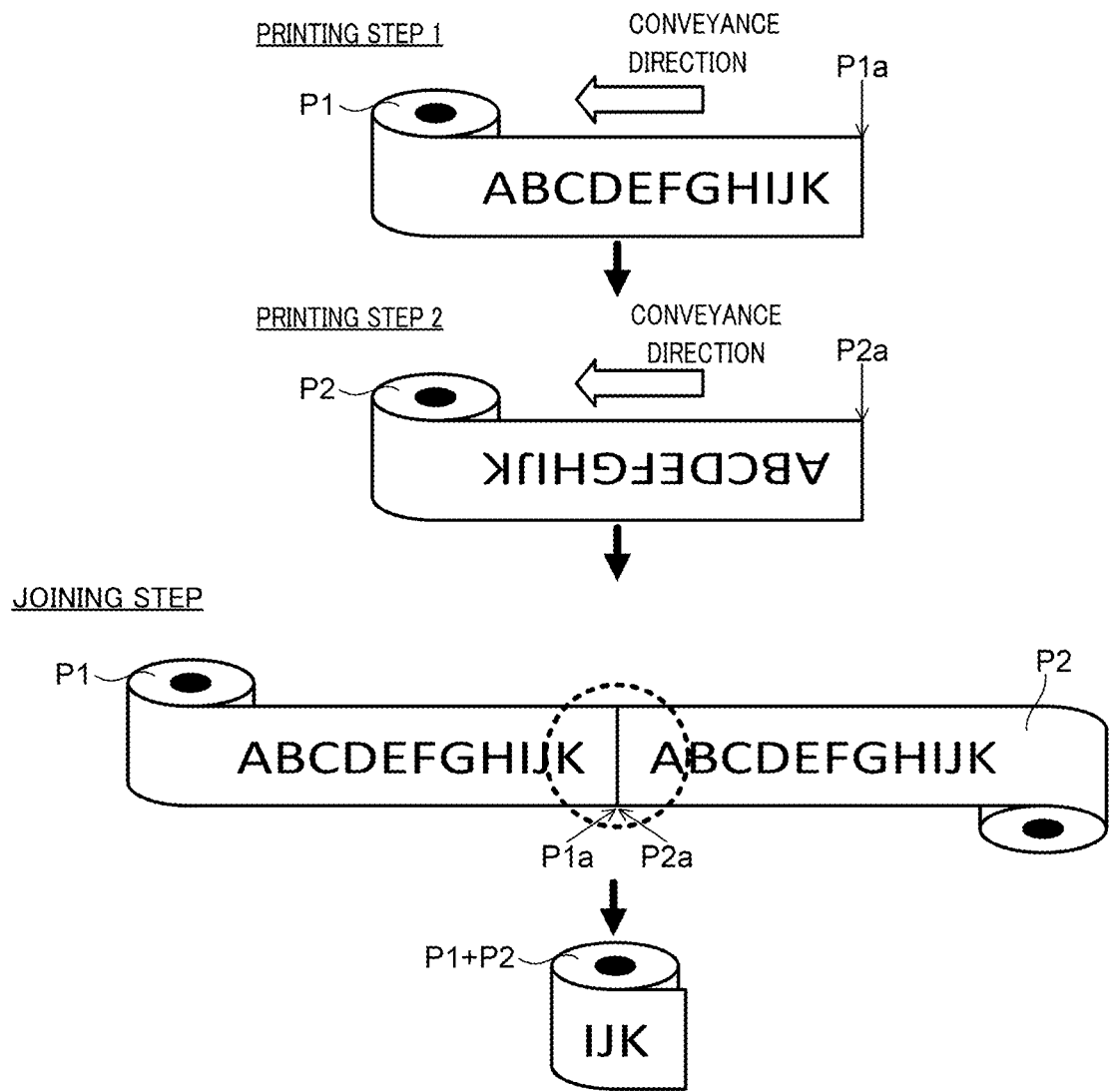
FIG. 5 is a diagram schematically illustrating a manufacturing process of a product roll sheet according to the embodiment.

In image forming apparatus U, sheet joining auxiliary apparatus T assists the joining operation of a plurality of resulting printed roll sheets on which the image is formed in each of the plurality of short jobs generated through the job division of the job pertaining to the printing execution command (see FIG. 5). This joining operation is an operation of sequentially joining a plurality of printed roll sheets in accordance with the execution order of the plurality of short jobs. Note that in the manufacturing process of the product roll sheet according to the present embodiment, the joining operation may be manually implemented by a worker or mechanically implemented by using a robot.

Sheet joining auxiliary apparatus T includes winding unit T1, feeding unit T2, work base T3, and control apparatus T4.

In sheet joining auxiliary apparatus T according to the present embodiment, feeding unit T2, work base T3, and winding unit T1 are disposed in this order from the upstream side toward the downstream side along the conveyance direction of sheet P, and the feed portion of the roll sheet fed from the roll sheet (hereinafter referred to also as "second roll sheet P2") set to feeding unit T2 is wound around the roll sheet (hereinafter referred to also as "first roll sheet P1") set to winding unit T1 into a single roll, in a roll-to-roll manner.

Winding unit T1 winds the unwound portion (i.e., the end portion of first roll sheet P1 pulled out to work base T3 side) of sheet P1 around first support shaft T1a by rotatably supporting sheet P1 (i.e., first roll sheet P1) wound and rolled around first support shaft T1a and driving the first support shaft T1a into rotation.

Feeding unit T2 sequentially feeds sheet P2 from second support shaft T2a side to the outside by rotatably supporting rolled sheet P2 (i.e., second roll sheet P2) wound and rolled around second support shaft T2a and pulling out the end portion of sheet P2 at the delivery roller.

Work base T3 is a work base for the worker to join sheet P1 and sheet P2 to each other. Work base T3 includes first pressure member T3a that pushes the end portion of sheet P1, second pressure member T3b that pushes the end portion of sheet P2, and the like, for example.

Control apparatus T4 is a controller that controls the operations of winding unit T1 and feeding unit T2 of sheet joining auxiliary apparatus T.

When joining sheet P1 and sheet P2 to each other, end portion P1a of sheet P1 set to winding unit T1 is pulled out to the position of work base T3 through the winding side conveyance roller pair, and end portion P2a of sheet P2 fed from feeding unit T2 is pulled out to the position of work base T3 through the feed side conveyance roller pair. Then, on work base T3, the worker pushes end portion P1a of sheet P1 with first pressure member T3a and pushes the end portion of sheet P2 with second pressure member T3b, and fixes the positions of end portion P1a of sheet P1 and end portion P2a of sheet P2 in the state where they are in contact with each other. Then, the worker joins end portion P1a of sheet P1 and end portion P2a of sheet P2 to each other by using a sealing material, a bonding material and/or the like.

Thereafter, by winding up sheet P1 at a desired speed at winding unit T1, one roll sheet composed of sheet P1 and sheet P2 integrated into a single roll is formed.

By repeating such an operation, a plurality of resulting printed roll sheets on which the image is formed through each of the plurality of short jobs generated through the job division of the job pertaining to the printing execution command are sequentially joined to each other in accordance with the execution order of the plurality of short jobs. That is, in this manner, one product roll sheet as an end product is formed.

Manufacturing Process of Product Roll Sheet

Next, a manufacturing process of the product roll sheet according to the embodiment of the present invention is described with reference to FIGS. 5 to 9.

FIG. 5 is a diagram schematically illustrating the manufacturing process of the product roll sheet according to the present embodiment.

As described above, image forming apparatus U according to the present embodiment has a job division function of dividing the job pertaining to the printing execution command into a plurality of short jobs in the case where the coverage of the image of the printing target is low and it is necessary to execute the RFP control before the job pertaining to the printing execution command is completed. Note that this job division function is achieved by control part 100 of image forming apparatus U.

More specifically, when using the job division function, control part 100 stops the conveyance of sheet P at the pause timing between the short jobs temporally adjacent to each other among the plurality of short jobs, to implement the replacement operation of the roll sheet of the printing target and execute the RFP control during that timing. Then, control part 100 completes the job pertaining to the printing execution command by sequentially executing the plurality of short jobs while interposing the pause timing.

That is, in image forming apparatus U according to the present embodiment, when the job division function is activated, a plurality of roll sheets is used until the printing of all of the image according to the printing command is completed. Then, a plurality of resulting printed roll sheets on which the image is formed in the plurality of short jobs is sequentially joined to each other in accordance with the execution order of the plurality of short jobs, and thus one product roll sheet is manufactured. Note that the RFP control itself that is executed by image forming part 40 under control part 100 at the pause timing between the short jobs is the same as the publicly known method as described above.

Note that FIG. 5 illustrates a state where control part 100 divides the job pertaining to the printing execution command into two short jobs, a first short job and a second short job. In the present aspect, a first printing step in which image forming apparatus U performs image formation on first roll sheet P1 in the first short job, a second printing step in which image forming apparatus U performs image formation on second roll sheet P2 in the second short job, and a joining step in which the worker joins first roll sheet P1 and second roll sheet P2 to each other by using sheet joining auxiliary apparatus T are sequentially executed, and thus one product roll sheet is manufactured.

In this manner, image forming apparatus U according to the present embodiment can prevent a situation where a blank region is formed in the course of the printing of the roll sheet along with the execution of the RFP control. Note that typically, the continuous printing distance in a short job is set to match the roll sheet length of the roll sheet of the printing target object. That is, in image forming apparatus U according to the present embodiment, the operation of cutting the blank region of the roll sheet is unnecessary, and the operation of the worker is completed only by joining the end portions of two roll sheets to each other.

As an aspect, preferably, control part 100 is configured to determine whether to divide the job pertaining to the printing execution command into a plurality of short jobs on the basis of the coverage information of the image of the printing target in the job pertaining to the printing execution command Specifically, it is preferable that control part 100 divide the job pertaining to the printing execution command into a plurality of short jobs such that the pause timing is provided in accordance with the timing that requires execution of the RFP control (i.e., the degree of degradation of the toner in developing device 412) that is specified by the coverage information of the image of the printing target.

Control part 100 executes the job pertaining to the printing execution command without dividing it into a plurality of short jobs when the coverage of the image of the printing target is the threshold value (e.g., 2%) or greater, whereas control part 100 executes the job pertaining to the printing execution command after dividing it into a plurality of short jobs when the coverage of the image of the printing target is smaller than the threshold value (e.g., 2%), for example. Then, control part 100 causes image forming part 40 to execute the RFP control in accordance with the pause timing of the plurality of short jobs. Note that the coverage is a value expressed by "the sum of each pixel density value"÷"the sum of the case where the density of the entire surface is 100%", and is 0% in the blank state (not printed) and 100% in the solid printing (printed in the entire surface) state, for example.

In addition, as an aspect, control part 100 preferably sets the continuous printing distance of each of the plurality of short jobs to a value (e.g., 500 m) that matches the standard roll sheet length of the common roll sheet when dividing the job pertaining to the printing execution command into a plurality of short jobs. In this manner, the continuous printing distance of one short job can match the timing of the printing from the start to the end of one roll sheet. That is, in this manner, the plurality of roll sheets generated in respective short jobs can be continuously joined to each other as they are without cutting them.

In addition, as an aspect, control part 100 preferably calculates the coverage of the image of the printing target as an average value of a predetermined continuous printing distance in the printing step. For example, control part 100 may calculate the coverage of the image of the printing target as the average value of the predetermined continuous printing distance by using the method of moving averages (see PTL 2 (Japanese Patent Application Laid-Open No. 2020-038276)) and the like. Note that the coverage of the image of the printing target may be calculated as the average value of the entirety of one printing job, or an average value of each of predetermined sections (e.g., A4 page unit) in one printing job.

In addition, control part 100 may calculate the coverage of the image of the printing target for each color of YMCK and execute the above-mentioned dividing process with the minimum value of the coverage of each color as the reference. In this manner, a situation where a degradation state of toner of a specific color is continued can be prevented.

In addition, as an aspect, control part 100 preferably provides a notification of facilitating replacement of the roll sheet of the printing target object set to image forming apparatus U at the pause timing between the short jobs temporally adjacent to each other among the plurality of short jobs. For example, at the pause timing between the short jobs, control part 100 may cause display part 21 to indicate a display for requesting replacement of the roll sheet of the printing target object (e.g., see FIG. 11). Note that such a notification means is optional, and a notification using a sound and/or a lamp may also be employed.

In this manner, in image forming apparatus U according to the present embodiment, control part 100 divides the job pertaining to the printing execution command into a plurality of short jobs, and, in synchronization with the pause timing between the short jobs, causes image forming part 40 to execute the RFP control and causes the replacement of the roll sheet of the printing target object to be performed. In this manner, formation of a blank region in the roll sheet of the printing target object due to execution of the RFP control can be prevented, and one product roll sheet can be manufactured by only joining the roll sheets of the printing target object of each of the plurality of short jobs.

The following describes an image inversion control required in conjunction with division of the job pertaining to the printing execution command into a plurality of short jobs.

Figure 6:
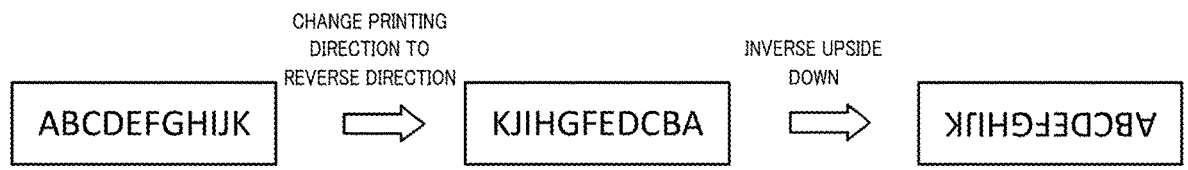
FIG. 6 is a diagram for describing an image inversion control by a control part.
Figure 7:
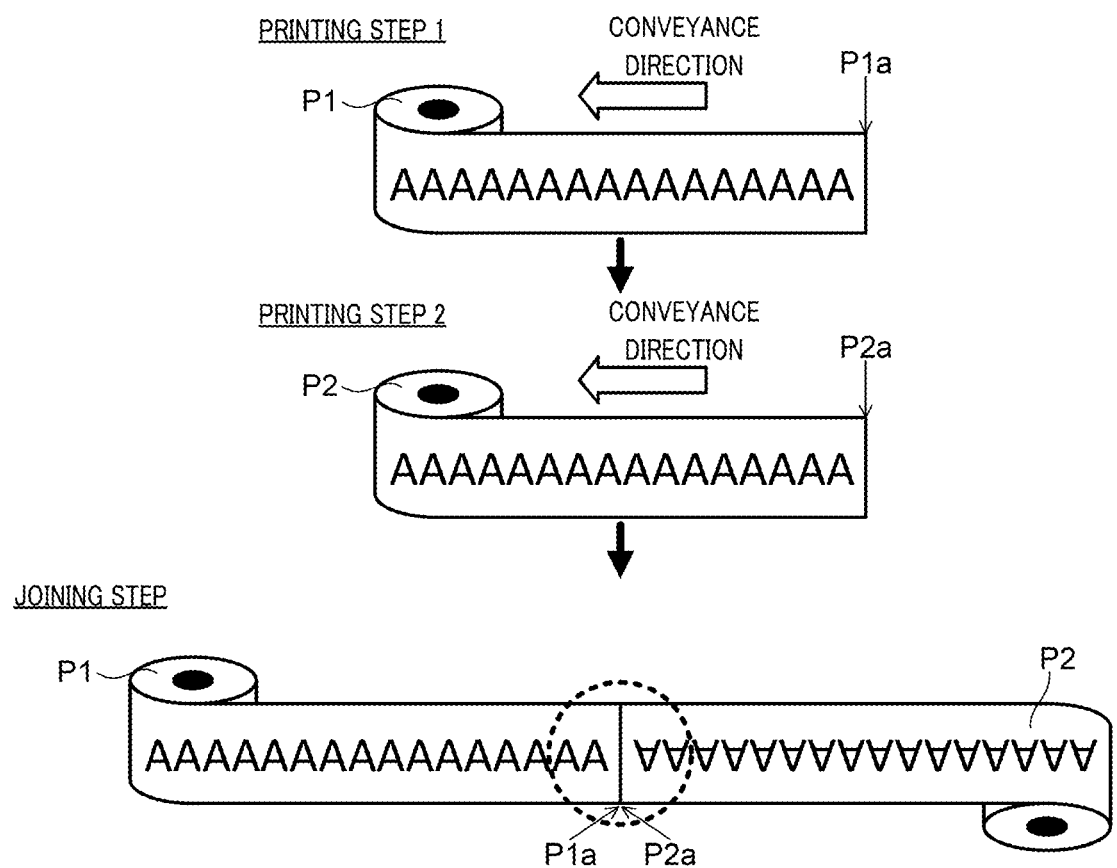
FIG. 7 is a diagram illustrating an example of a completion mode of a product roll sheet in a case assuming that the image inversion control by the control part is not performed.

FIG. 6 is a diagram for describing an image inversion control of control part 100. FIG. 7 is a diagram illustrating an example of a completion mode of a product roll sheet that is manufactured if an image inversion control of control part 100 is not performed.

In the printing step, control part 100 sets the job content of each of the plurality of short jobs such that for each job switching of the plurality of short jobs, the image of the printing target is inverted upside down and the forward/reverse printing direction of the image of the printing target is inverted (see FIG. 6). This prevents a situation where when the roll sheets of the printing target object are joined to each other in the plurality of short jobs, the images of one side and the other side are inverted upside down, or left to right with respect to the joined point in the joining step.

As described above, the joining step is performed using sheet joining auxiliary apparatus T illustrated in FIG. 4, for example. For example, in the joining step, in the state where first roll sheet P1 on which an image is formed in the first printing step is set to winding unit T1 of sheet joining auxiliary apparatus T and second roll sheet P2 on which an image is formed in the second printing step is set to feeding unit T2 of sheet joining auxiliary apparatus T, the operation of the joining rear end portion P1*a* of first roll sheet P1 and rear end portion P2*a* of second roll sheet P2 is performed. Then, when winding unit T1 sequentially winds up rear end portion P1*a* side of first roll sheet P1, one product roll sheet in which first roll sheet P1 and second roll sheet P2 are integrated into a single roll (this means a state where first roll sheet P1 and second roll sheet P2 are joined to each other and first roll sheet P1 and second roll sheet P2 are wound around the roll core of first roll sheet P1 or second roll sheet P2; the same shall apply hereinafter).

Note that if no image inversion control is performed between image printing on first roll sheet P1 and image printing on second roll sheet P2 and they are joined to each other, the image printed on second roll sheet P2 is inverted upside down and left to right with respect to the image printed on first roll sheet P1 (see FIG. 7). That is, in this case, the image inverted upside down and left to right is mixed in the product roll sheet as the end product. Note that FIG. 7 illustrates a state where an image inverted upside down is mixed in the product roll sheet as the end product. In the case where the image of the printing target is not a bilaterally symmetric image, the image on one side and the image on the other side with respect to the joining point are further inverted left to right in the product roll sheet as the end product.

From such a viewpoint, control part 100 according to the present embodiment sets the job content of each of the plurality of short jobs such that for each job switching of the plurality of short jobs, the image of the printing target is inverted upside down, and the forward/reverse printing direction of the image of the printing target is inverted.

Control part 100 causes image processing part 30 to execute the process according to the image inversion, for example. Specifically, the control part causes the image processing part 30 to edit the input image data such that for each job switching of the plurality of short jobs, the image of the printing target is inverted upside down and the forward/reverse printing direction of the image of the printing target is inverted. Note that the inversion of the forward/reverse printing direction of the image of the printing target means reversing of the direction from the printing start position toward the printing end position of the image of the printing target. Control part 100 causes image processing part 30 to perform edit such that input image data arranged from the pixel data of the first line address to the pixel data of nth line address in the direction from the printing start position toward the printing end position in the forward order becomes image data arranged from the pixel data of the nth line address to the pixel data of the first line address in the direction from the printing start position toward the printing end position in the reverse order, for example.

Note that even in the case where the number of divisions of the job pertaining to the printing execution command is three or greater, the manufacturing process of the product roll sheet is the same as the above-mentioned case. Specifically, as described above, control part 100 sets the job content of the short job obtained by dividing the job pertaining to the printing execution command, such that for each job switching of the short job, the image of the printing target is inverted upside down and the forward/reverse printing direction of the image of the printing target is inverted. Then, the product roll sheet is manufactured by sequentially joining, into a single roll, a plurality of resulting printed roll sheets on which the image is formed in each of the plurality of short jobs, in accordance with the execution order of the plurality of short jobs.

Figure 8:
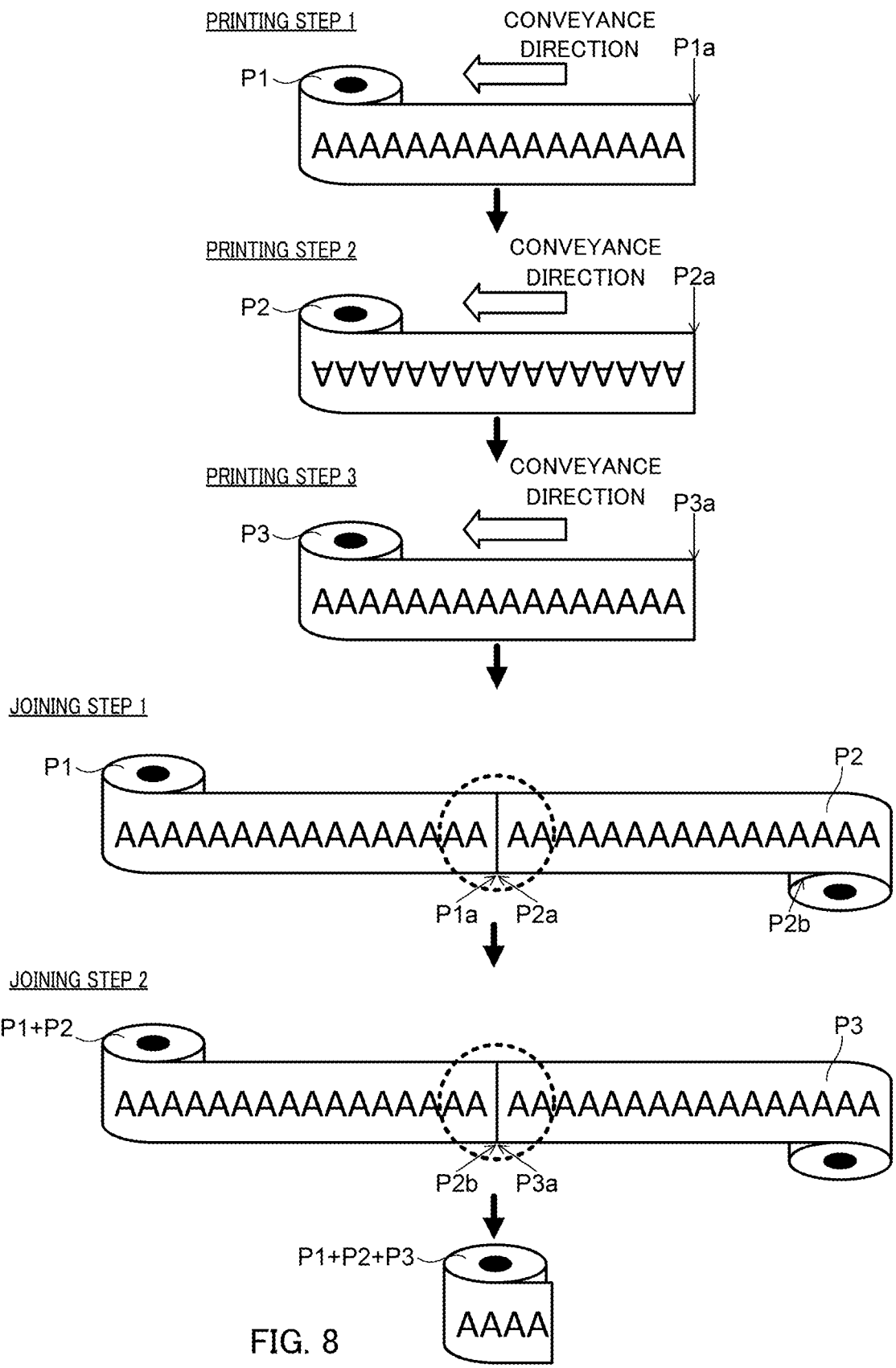
FIG. 8 is a diagram schematically illustrating a method of manufacturing a product roll sheet in the case where a job pertaining to a printing execution command is divided into three short jobs by a control part.

FIG. 8 is a diagram schematically illustrating a method of manufacturing a product roll sheet in the case where the job pertaining to the printing execution command is divided into three short jobs by control part 100.

Also in this mode, control part 100 sets the job content of each of the first, second and third short jobs such that for each job switching of the short job, the image of the printing target is inverted upside down, and the forward/reverse printing direction of the image of the printing target is inverted, as in the above-mentioned manner. Then, control part 100 performs the printing according to the short jobs on individual roll sheets (first roll sheet P1, second roll sheet P2, and third roll sheet P3).

In the case where the job pertaining to the printing execution command is divided into three short jobs, first, in the joining step using sheet joining auxiliary apparatus T, first roll sheet P1 on which printing has been performed in the first short job is set to winding unit T1, second roll sheet P2 on which printing has been performed in the second short job is set to feeding unit T2, and rear end portion P2a of second roll sheet P2 is joined to rear end portion P1a of first roll sheet P1, for example. Then, winding unit T1 winds up the sheet of first roll sheet P1 and the sheet of second roll sheet P2, and thus two roll sheets is integrated into a single roll.

Thereafter, through the same process, in the state where first roll sheet P1 and second roll sheet P2 integrated into a single roll are set to winding unit T1, third roll sheet P3 on which printing has been performed in the third short job is set to feeding unit T2. Then, rear end portion P3a of third roll sheet P3 is joined to rear end portion P2b of first roll sheet P1 and second roll sheet P2 integrated into a single roll (which corresponds to the start end of second roll sheet P2) and winding unit T1 winds up these sheets, and thus, these roll sheets are integrated into a single roll.

Operation Flow of Image Forming Apparatus (Control Part)

Figure 9:
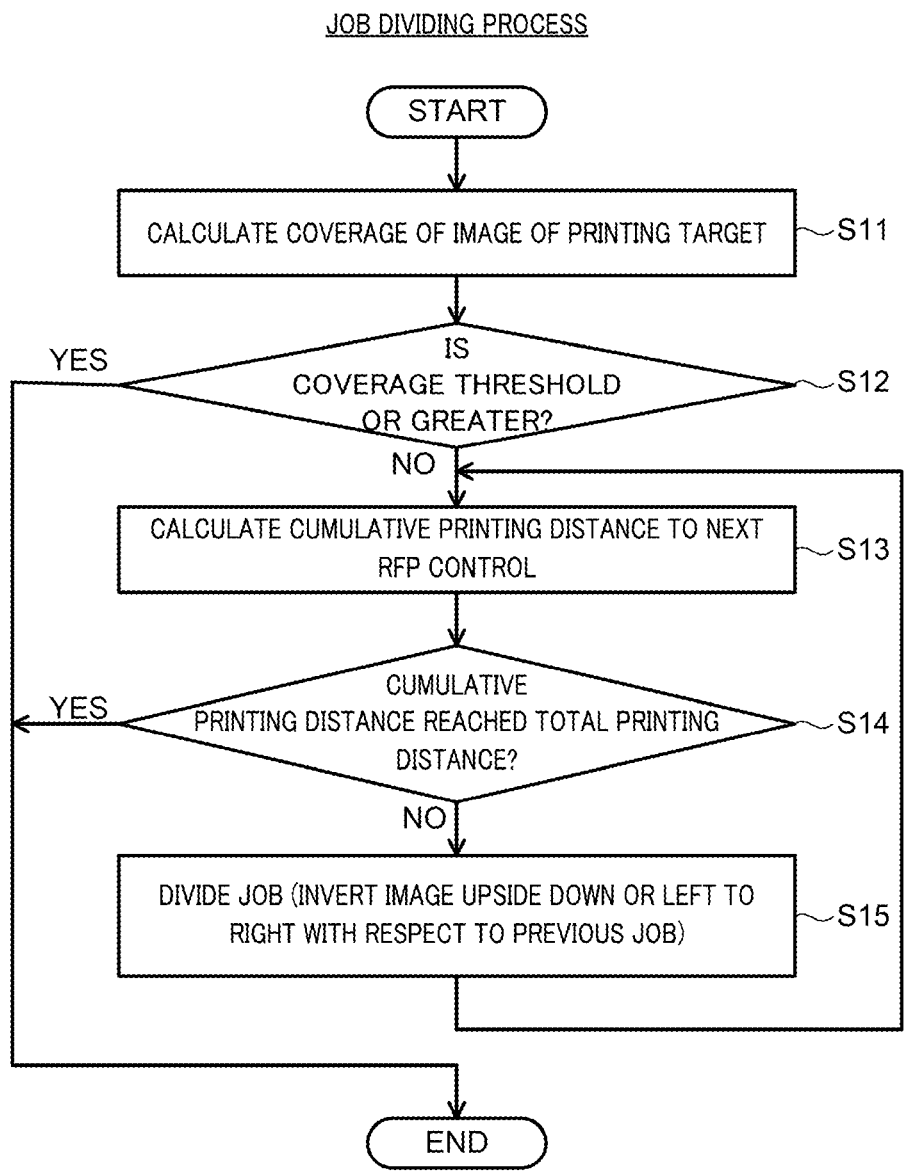
FIG. 9 is a flowchart illustrating an example of a job dividing process of an image forming apparatus (control part) according to the embodiment.

FIG. 9 is a flowchart illustrating an example of a job dividing process of image forming apparatus U (control part 100). The flowchart illustrated in FIG. 9 is a process sequentially executed by control part 100 in accordance with a computer program when a printing execution command is received from an external apparatus (e.g., external computer), for example.

Note that in this flowchart, it is assumed that the image of the printing target is a repetitive image such as a label image, i.e., the average coverage in the entire job pertaining to the printing execution command is substantially constant from the printing start position to the printing end position. In addition, in this flowchart, the job division of the job pertaining to the printing execution command is not performed when the average coverage in the entire job is equal to or greater than a threshold value (e.g., 2%), and the job division of the job pertaining to the printing execution command not performed in a unit of a continuous printing distance of 500 m (500 m is a value that matches the standard roll sheet length of the common roll sheet) when the average coverage in the entire job is smaller than the threshold value (e.g., 2%).

At step S11, first, control part 100 calculates the coverage of the image of the printing target designated by the job pertaining to the printing execution command.

Note that at this time, control part 100 calculates the coverage of the image of the printing target as the average coverage of the entire job pertaining to the printing execution command by using the method of moving averages, for example. In addition, at this time, control part 100 calculates the coverage of each of the four colors YMCK of the image of the printing target on the basis of the image data of the image of the printing target, and sets one color with the smallest coverage value among the coverages of the four colors YMCK as the determination reference at step S12, for example.

At step S12, control part 100 determines whether the coverage calculated at step S11 (the coverage of the color with the smallest coverage value among the four colors YMCK) is not smaller than the threshold value (e.g., 2%). Then, control part 100 terminates the process of the flowchart of FIG. 9 without performing processes (i.e., without performing job division) when the coverage is equal to or greater than the threshold value (e.g., 2%) (S12: YES), whereas control part 100 advances the process to step S13 to perform the job division of the job pertaining to the printing execution command when the coverage is smaller than the threshold value (e.g., 2%) (S12: NO).

At step S13, control part 100 calculates the cumulative printing distance to the next RFP control. Here, control part 100 divides the job in a unit of continuous printing distance 500 m, and, in the first job division, the cumulative printing distance to the next RFP control is calculated to be 500 m.

At step S14, control part 100 determines whether the cumulative printing distance calculated at step S13 has reached the total printing distance (the total printing distance according to the printing command of the printing execution command) Then, when the cumulative printing distance has reached the total printing distance (S14: YES), control part 100 terminates the process of the flowchart of FIG. 9 in the state where the number of job divisions that has been determined at that time point (i.e., the number of times of the repetition of step S13 to S15) is stored and held. For example, in the case where the total printing distance according to the printing command of the printing execution command is 2000 m, the job division is performed four times (=2000 m 500 m). When the cumulative printing distance has not reached the total printing distance (S14: NO), control part 100 advances the process to step S15.

At step S15, control part 100 performs the job division of the job pertaining to the printing execution command Here, control part 100 creates one short job by performing the job division for the region advanced by 500 m, which is unit continuous printing distance, from the end point of the cumulative printing distance at the current time point in the entire job pertaining to the printing execution command.

Note that at step S15, control part 100 sets the job content such that in the short job created at this time, the image is inverted upside down and the forward/reverse printing direction of the image of the printing target is inverted, with respect to the previous short job. Then, after the process of step S15, control part 100 returns to steps S13 and S14, and again determines whether the further job division is necessarily.

Figure 10:
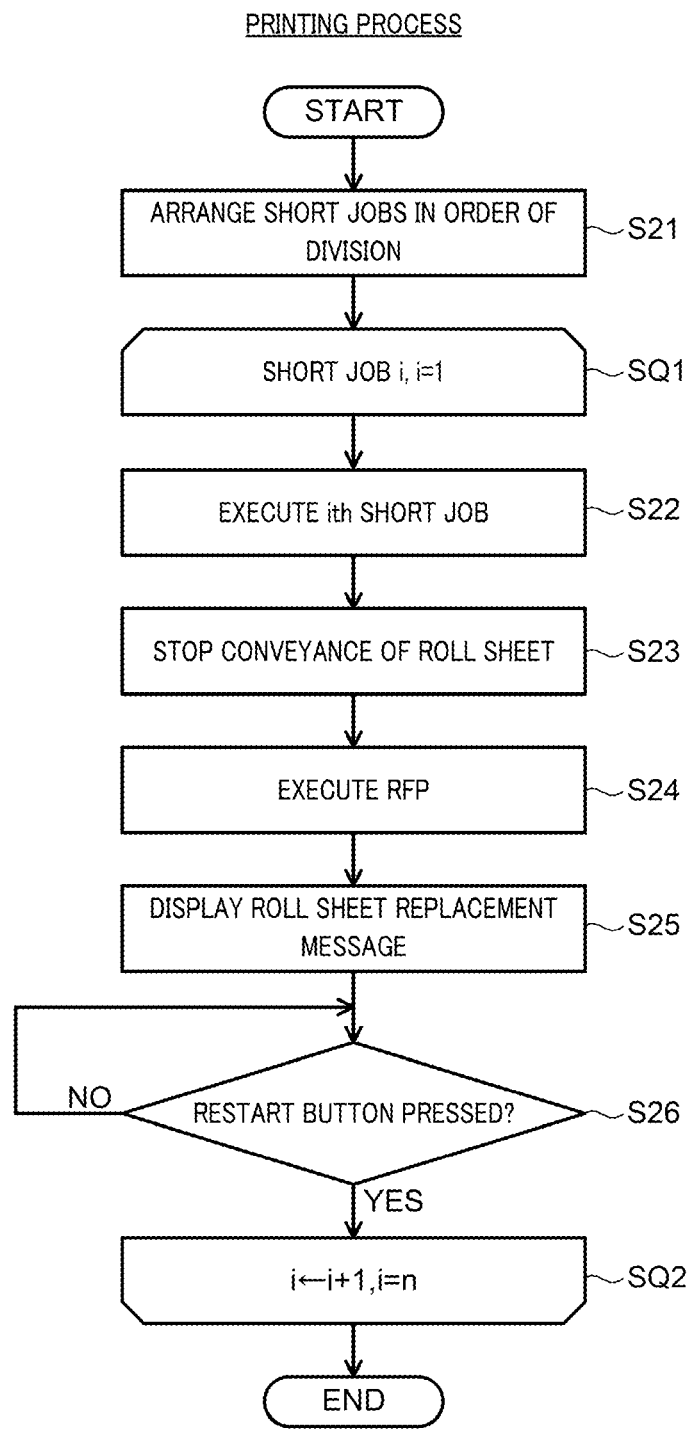
FIG. 10 is a flowchart illustrating an example of a printing process of the image forming apparatus (control part) according to the embodiment.

FIG. 10 is a flowchart illustrating an example of a printing process of image forming apparatus U (control part 100). The flowchart illustrated in FIG. 10 is a process sequentially executed by control part 100 in accordance with a computer program after the job dividing process of FIG. 9 is executed, for example.

At step S21, first, control part 100 arranges the plurality of short jobs generated by dividing the job pertaining to the printing execution command in the process of the flowchart of FIG. 9, in the order of the divisions.

Next, control part 100 sequentially executes the plurality of short jobs arranged at step S21 through the loop process of SQ1 to SQ2. Note that FIG. 10 illustrates a state where the job pertaining to the printing execution command is divided into n jobs, and the first short job to the nth short job are sequentially executed.

At step S22, control part 100 executes the ith short job. At step S23, control part 100 stops the conveyance of the roll sheet in response to the completion of ith short job. At step S24, control part 100 executes the RFP control, and forcibly ejects the degraded toner from developing device 412 of image forming part 40. At step S25, control part 100 causes display part 21 to display a message for facilitating the user to replace the roll sheet.

Figure 11:
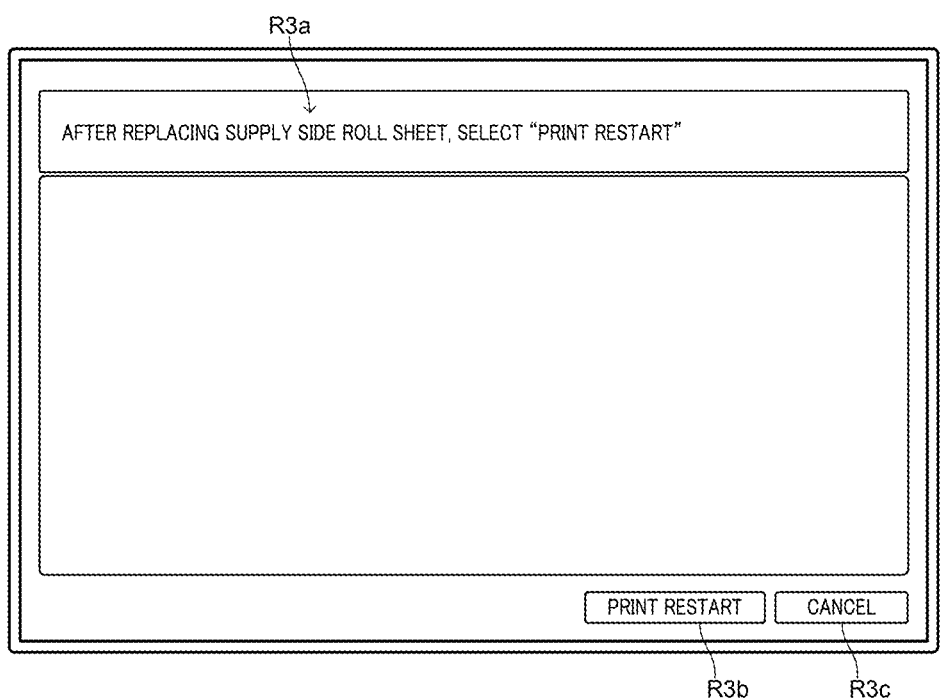
FIG. 11 is a diagram illustrating an example of a message displayed and output on a display part by the control part.

FIG. 11 is a diagram illustrating an example of message R3a to be displayed and output by display part 21 under control part 100. Note that at this time, control part 100 displays, on the display screen of display part 21, printing resumption icon R3b for inputting command for transition to the next short job, and cancel icon R3c for inputting command for cancelling all short jobs once, together with message R3a for facilitating the replacement of the roll sheet, for example.

At step S26, control part 100 waits for selection of printing resumption icon R3b (see FIG. 11) (S26: NO). Then, when printing resumption icon R3b is selected (S26: YES), then it transitions to the next short job (the i+1th short job) and executes the processes of steps S22 to S26 again.

Image forming apparatus U (control part 100) executes that process for all of the plurality of short jobs generated by dividing the job pertaining to the printing execution command, and thus completes the job pertaining to the printing execution command Note that thereafter, one product roll sheet is configured by joining a plurality of printed roll sheets into a single roll as described above.

Effects

As described above, in image forming apparatus U according to the present embodiment, under the control of control part 100, the job pertaining to the printing execution command is divided into a plurality of short jobs, and, for each pause timing between the short jobs, the roll of the roll sheet of the printing target object is replaced and the degraded toner is forcibly ejected from developing device 412 of image forming part 40.

Thus, with image forming apparatus U according to the present embodiment, the product roll sheet as the end product can be manufactured without forming a blank region due to the RFP control during the printing image. That is, with image forming apparatus U according to the present embodiment, it is possible to suppress the reduction of the production efficiency, the increase of the burden of the operation of the worker, and occurrence of operation errors due to the operation of cutting the blank region from the roll sheet after printing.

In addition, in image forming apparatus U according to the present embodiment, the job content of each of the plurality of short jobs generated by dividing the job pertaining to the printing execution command is set such that for each job switching of the plurality of short jobs, the image of the printing target is inverted upside down, and the forward/reverse printing direction of the image of the printing target is inverted.

Thus, with image forming apparatus U according to the present embodiment, the image inverted upside down or left to right is not generated at middle portions in the product roll sheet as the end product (i.e., the product roll sheet formed by joining a plurality of roll sheets). That is, in this manner, for the user using product roll sheet, it is possible to reduce the task of the operation for calibration of the production apparatus (e.g., a die cutting apparatus for cutting out labels from the roll sheet) in accordance with the orientation of the image in the roll sheet each time.

Modification 1

The job division function of image forming apparatus U (control part 100) may have a function of adding a job content of printing of a header/stamp image for each of a plurality of short jobs so that when the job pertaining to the printing execution command is divided into the plurality of short jobs, the start position and/or the end position of the plurality of short jobs are identifiable.

Figure 12:
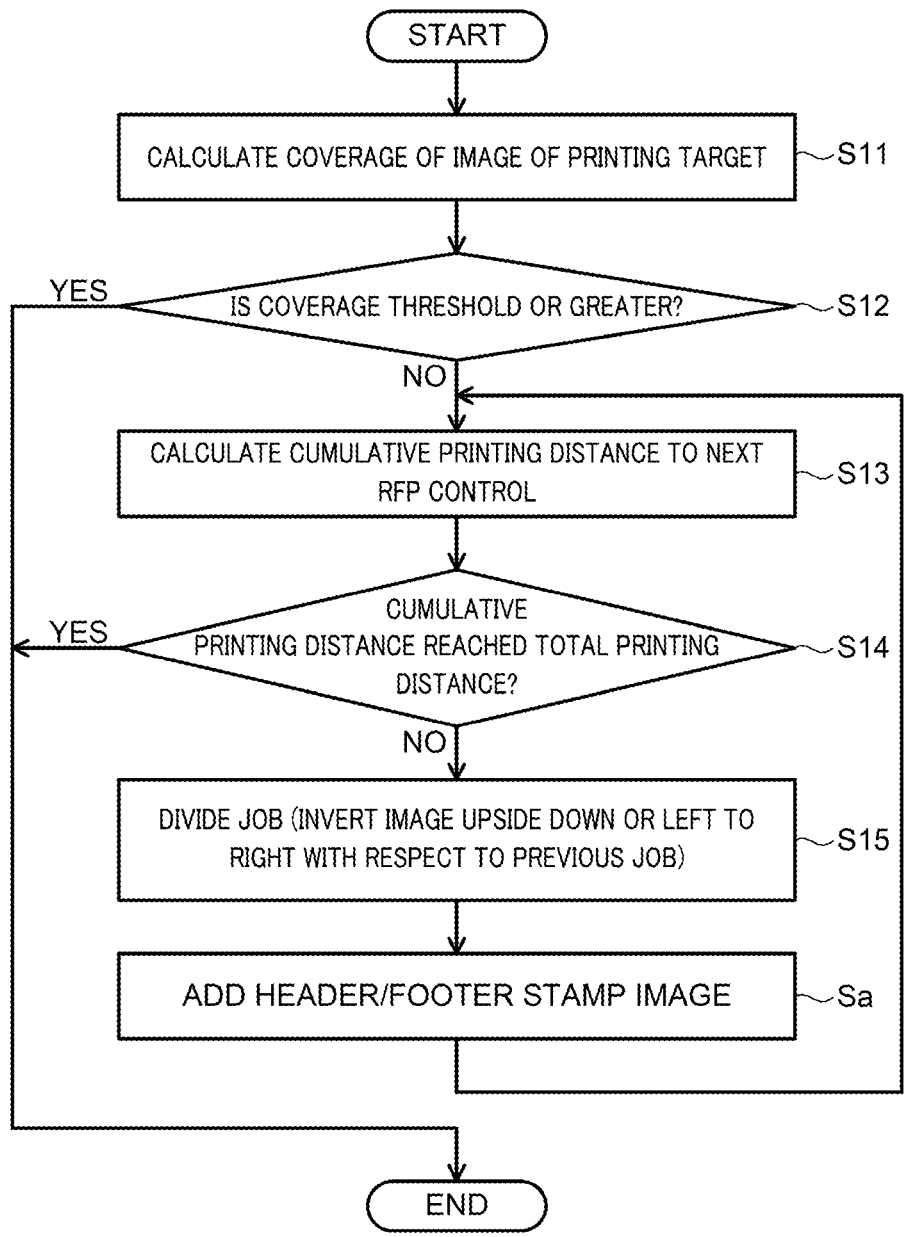
FIG. 12 is a flowchart illustrating an example of a job dividing process of an image forming apparatus (control part) according to Modification 1.

FIG. 12 is a flowchart illustrating an example of a job dividing process of image forming apparatus U (control part 100) according to the present modification. The flowchart of FIG. 12 is different from the flowchart of FIG. 9 only in that the process of step Sa is added immediately after step S15. Specifically, in the present modification, when a short job is generated by dividing the job pertaining to the printing execution command (step S15), control part 100 adds a header/stamp image to that image of the printing target (step Sa).

Figure 13:
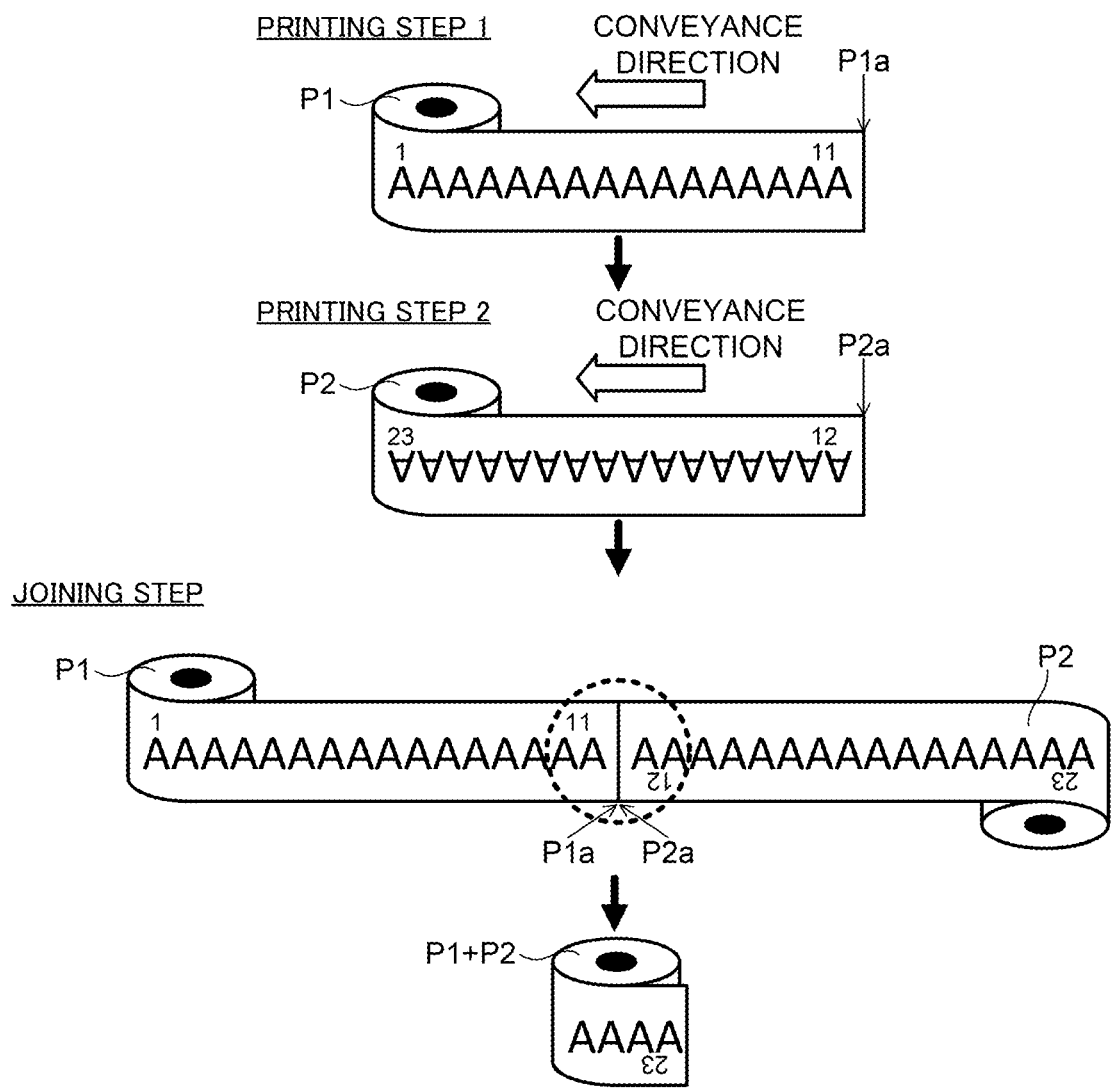
FIG. 13 is a diagram illustrating an example of a header/stamp image of the image forming apparatus (control part) according to Modification 1.
Figure 14:
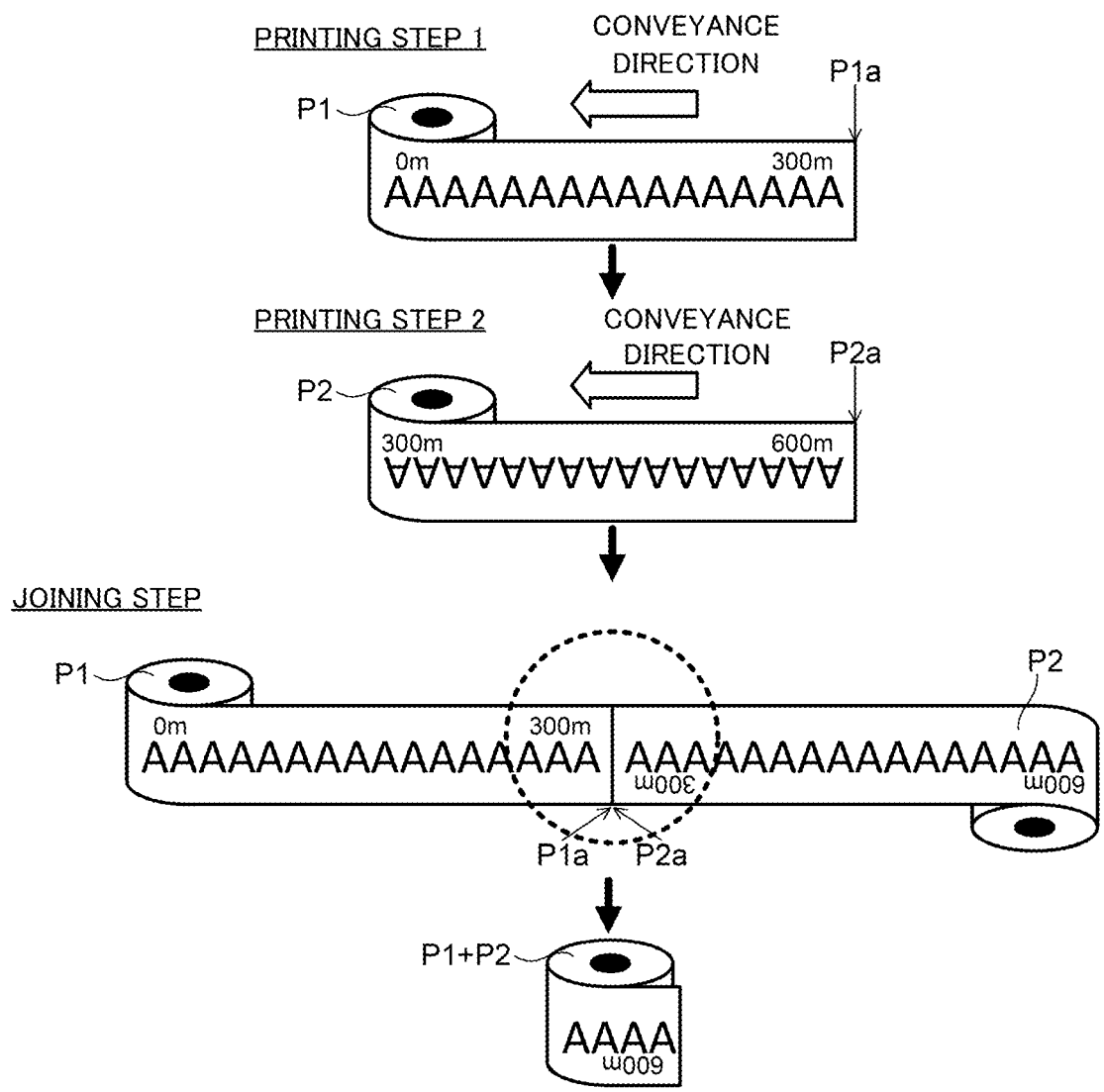
FIG. 14 is a diagram illustrating another example of a header/stamp image of the image forming apparatus (control part) according to Modification 1.

FIG. 13 is a diagram illustrating an example of a header/stamp image. FIG. 14 is a diagram illustrating another example of a header/stamp image.

As described in the above-mentioned embodiment, the product roll sheet according to the present disclosure is manufactured by sequentially joining a plurality of roll sheets printed by image forming apparatus U in accordance with the execution order of the plurality of short jobs. Here, in the case where the printing distance set to the job pertaining to the printing execution command is short (e.g., 1000 m), the number of roll sheets to be joined is small, and therefore there is no risk of the user to mistake the joining point of the roll sheets. However, in the case where the printing distance set to the job pertaining to the printing execution command is long (e.g., 5000 m), the number of the roll sheets to be joined is large, and therefore there is a risk of the user to mistake the joining point of the roll sheets.

From such a viewpoint, image forming apparatus U according to the present modification is configured to print the header/stamp images representing the start position and/or the end position of the plurality of short jobs in the plurality of short jobs.

Note that the favorable header/stamp image is images representing the start page number and the rear end page number of each of the plurality of short jobs in the entire printing page in the job pertaining to the printing execution command (see FIG. 13), and images representing the cumulative printing distance from the printing start position in the job pertaining to the printing execution command to the start position and the end position of each of the plurality of short jobs (see FIG. 14).

In this manner, when forming the product roll sheet as the end product (i.e., the joining step), the user can specify the joining position from the printed roll sheet, and thus the mistake of the joining position of the roll sheets can be suppressed.

Additionally, in this manner, when using the sheet by extracting it from the product roll sheet, the user can use the roll sheet while avoiding the joint position (i.e., the joined position of two roll sheets; the same shall apply hereinafter), and can use the roll sheet while checking the used distance.

Figure 15:
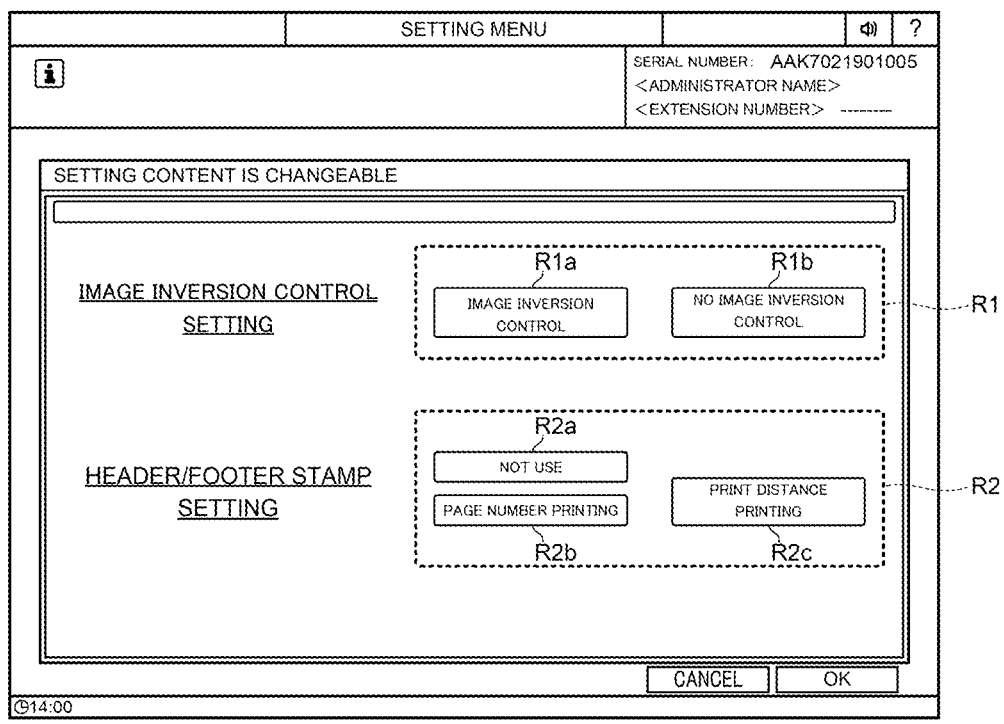
FIG. 15 is a diagram illustrating an example of a UI screen for setting a header/stamp image in the image forming apparatus (control part) according to Modification 1.

FIG. 15 is a diagram illustrating an example of a UI screen for setting the header/stamp image. The UI screen illustrated in FIG. 15 is a display screen that is displayed by display part 21 under control part 100 before execution of printing, and here, icons R1a and R1b for "setting of image inversion control", and icons R2a, R2b and R2c for "setting of header/footer stamp setting" are displayed. For example, in the UI screen illustrated in FIG. 15, the user can select whether to perform the image inversion control (see FIG. 6) for each job switching of the short job during the printing by selecting icon R1a or icon R1b. In addition, in the UI screen illustrated in FIG. 15, the user can select whether to add the header/stamp image in the image printed in each short job and select the mode of the header/stamp image (the page image or the cumulative printing distance image) during the printing by selecting icon R2a, icon R2b or icon R2c.

Modification 2

The job division function of image forming apparatus U (control part 100) may be configured to change the setting of the continuous printing distance of the short job in accordance with the coverage of the image of the printing target when dividing the job pertaining to the printing execution command into a plurality of short jobs.

FIG. 16 is a diagram illustrating an example of a data table that defines a correspondence relationship between the coverage of the image of the printing target and the continuous printing distance of the short job, which is referred to by control part 100 when executing the job dividing process.

The frequency or degree of generation of degraded toner is typically directly proportional to the size of the coverage of the image of the printing target. From such a viewpoint, the data table illustrated in FIG. 16 is set such that the greater the coverage of the image of the printing target, the longer the continuous printing distance of the short job. Note that the data table representing that correspondence relationship is set by determining the frequency or degree of generation of degraded toner for each coverage of the image of the printing target through an experiment and the like in advance, and is stored in ROM 100b and the like, for example.

After the coverage of the image of the printing target of the job pertaining to the printing execution command is calculated at the time of the job dividing process, control part 100 according to the present modification determines the continuous printing distance of the short job on the basis of the coverage and the data table illustrated in FIG. 16, for example.

In this manner, at the time of the job dividing process, the continuous printing distance can be appropriately set in accordance with the timing when the RFP control is required.

In addition, instead of the configuration of uniformly setting the same continuous printing distance for each of the plurality of short jobs when dividing the job pertaining to the printing execution command into a plurality of short jobs, control part 100 may set different values for the continuous printing distances of the plurality of short jobs. For example, in some jobs according to the printing execution command, the coverage of the image of the printing target can in some cases differ depending on the printing position during the job. In this case, control part 100 may divide the job pertaining to the printing execution command for each predetermined section, calculate the coverage of the image of the printing target for each predetermined section, and set the continuous printing distance of the short job on the basis of the coverage of the image of the printing target of that section.

OTHER EMBODIMENTS

The present invention is not limited to the above-mentioned embodiments, and various modifications may be made.

In the above-mentioned embodiment, as an example of control part 100 according to the present disclosure, a configuration is described in which whether to divide the job pertaining to the printing execution command into a plurality of short jobs is determined on the basis of the coverage information of the image of the printing target in the job pertaining to the printing execution command. However, the necessity of the RFP control can be determined based on the empirical rule of the user and the like, and in this case, control part 100 may be configured to divide, each time, the job pertaining to the printing execution command into a plurality of short jobs through user setting and the like without performing that determination process.

In addition, in the above-mentioned embodiment, a bilaterally asymmetric image is described as an example of the image of the printing target. However, naturally, as an example of the image of the printing target, the image of the printing target may be a bilaterally symmetric image. In such a case, control part 100 may perform only a process of inverting the image of the printing target upside down for each job switching of the plurality of short jobs.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus of a roll-to-roll type, comprising:
an image former including an image bearing member configured to bear toner, the image former being configured to perform printing, on a roll sheet, an image formed by performing light exposure and a development process on the image bearing member; and
a hardware processor configured to control the image former on a basis of a job pertaining to a printing execution command,
wherein the hardware processor is configured to divide the job pertaining to the printing execution command into a plurality of short jobs, and configured to stop conveyance of the roll sheet and forcibly eject degraded toner from a developing device of the image former at a pause timing between short jobs temporally adjacent to catch other among the plurality of short jobs; and
wherein the hardware processor sets a job content of each of the plurality of short jobs such that an image of a printing target is inverted upside down for each job switching of the plurality of short jobs.

2. The image forming apparatus according to claim 1, wherein the hardware processor sets the job content of each of the plurality of short jobs such that for each job switching of the plurality of short jobs, the image of the printing target is inverted upside down and a forward/reverse printing direction of the image of the printing target is inverted.

3. The image forming apparatus according to claim 1, wherein, at the pause timing, the hardware processor outputs a notification for facilitating a user to replace the roll sheet of a printing target object.

4. The image forming apparatus according to claim 1, wherein the hardware processor determines whether to divide the job pertaining to the printing execution command into the plurality of short jobs on a basis of coverage information of an image of a printing target of the job pertaining to the printing execution command.

5. The image forming apparatus according to claim 1, wherein a product roll sheet is formed by sequentially joining a plurality of the roll sheets after printing on which an image is formed in each of the plurality of short jobs, in accordance with an execution order of the plurality of short jobs.

6. The image forming apparatus according to claim 1, wherein a continuous printing distance of each of the plurality of short jobs is set to match a roll sheet length of the roll sheet of a printing target object.

7. The image forming apparatus according to claim 1, wherein the hardware processor adds, to each of the plurality of short jobs, a job content for performing printing of a header/stamp image such that a start position and/or an end position of each of the plurality of short jobs is identifiable.

8. The image forming apparatus according to claim 7, wherein the header/stamp image includes a start page number and a last page number in an entire printing page in the job pertaining to the printing execution command.

9. The image forming apparatus according to claim 7, wherein the header/stamp image includes a cumulative printing distance from a printing start position to a start position and an end position of each of the plurality of short jobs in the job pertaining to the printing execution command.

10. A control method for an image forming apparatus of a roll-to-roll type, the image forming apparatus including an image bearing member configured to bear toner, and an image former configured to perform printing, on a roll sheet, an image formed by performing light exposure and a development process on the image bearing member, the control method comprising:
   a first process of dividing a job pertaining to a printing execution command into a plurality of short jobs; and
   a second process of stopping conveyance of the roll sheet and forcibly ejecting degraded toner from a developing device of the image former at a pause timing between short jobs temporally adjacent to each other among the plurality of short jobs at execution of printing,
   wherein in the first process, a job content of each of the plurality of short jobs is set such that an image of a printing target is inverted upside down for each job switching of the plurality of short jobs.

11. A computer-readable recording medium storing a control program of an image forming apparatus of a roll-to-roll type, the image forming apparatus including an image bearing member configured to bear toner, and an image former configured to perform printing, on a roll sheet, an image formed by performing light exposure and a development process on the image bearing member, the program comprising:
   a first process of dividing a job pertaining to a printing execution command into a plurality of short jobs; and
   a second process of stopping conveyance of the roll sheet and forcibly ejecting degraded toner from a developing device of the image former at a pause timing between short jobs temporally adjacent to each other among the plurality of short jobs at execution of printing,
   wherein in the first process, a job content of each of the plurality of short jobs is set such that an image of a printing target is inverted upside down for each job switching of the plurality of short jobs.

* * * * *